United States Patent
Vahidi et al.

(10) Patent No.: US 8,468,038 B2
(45) Date of Patent: *Jun. 18, 2013

(54) SYSTEM AND METHOD FOR PROCESSING WORK PRODUCTS FOR VEHICLES VIA THE WORLD WIDE WEB

(75) Inventors: Reza-Sayed Vahidi, Pleaseanton, CA (US); Stan Griffin, Livermore, CA (US); Pankaj Desai, Walnut Creek, CA (US); Sonja Larson, Benicia, CA (US); Robert Cooperrider, Canby, OR (US); John W. Fitzpatrick, West Linn, OR (US); Sergey Gorelov, Clackamas, OR (US)

(73) Assignee: Audatex North America, Inc.

( * ) Notice: Subject to any disclaimer, the term of this patent is extended or adjusted under 35 U.S.C. 154(b) by 0 days.

This patent is subject to a terminal disclaimer.

(21) Appl. No.: 13/463,628

(22) Filed: May 3, 2012

(65) Prior Publication Data

US 2012/0215568 A1 Aug. 23, 2012

Related U.S. Application Data

(63) Continuation of application No. 13/026,842, filed on Feb. 14, 2011, now Pat. No. 8,200,513, which is a continuation of application No. 10/979,926, filed on Nov. 1, 2004, now Pat. No. 7,912,740.

(51) Int. Cl.
*G06Q 40/08* (2012.01)
(52) U.S. Cl.
USPC ............... 705/4; 705/36 R; 705/39; 705/40; 705/26; 705/306; 701/31.4
(58) Field of Classification Search
USPC ................................ 705/4, 36 R, 40, 35, 26
See application file for complete search history.

(56) References Cited

U.S. PATENT DOCUMENTS

| | | | |
|---|---|---|---|
| 5,504,674 | A | 4/1996 | Chen et al. |
| 5,839,112 | A | 11/1998 | Schreitmueller et al. |
| 5,950,169 | A | 9/1999 | Borghesi et al. |
| 6,185,540 | B1 | 2/2001 | Schreitmueller et al. |
| 6,397,131 | B1 | 5/2002 | Busch et al. |
| 7,441,225 | B2 | 10/2008 | Boutin et al. |
| 7,953,615 | B2 | 5/2011 | Aquila et al. |

(Continued)

OTHER PUBLICATIONS

Business Wire, Inc., CCC Information Services and Farmers Insurance Exchange Sign Exclusive Agreement; Three-Year Exclusive Agreement to Include Pathways Appraisal Solution and TL2000, Dec. 11, 2000, Business Editors.

(Continued)

*Primary Examiner* — Vanel Frenel
(74) *Attorney, Agent, or Firm* — Ben J. Yorks; Irell & Manella LLP (57) ABSTRACT

A method and system for receiving data relating to an insurance claim for a damaged vehicle and transmitting a valuation report for the damaged vehicle over the world wide web. The system includes a client computer and a web server that are coupled through an electronic communication network such as the internet. The web server contains a web site that contains a plurality of web pages. Each web page allows an operator to enter the insurance claim data. The data can be processed into a valuation report by a separate valuation server. The valuation report can be transmitted to the client computer through the web server. A claims adjuster can access the web server by merely entering a uniform resource locator ("URL") into a web browser. The adjuster does not have to dial directly into the valuation server.

31 Claims, 7 Drawing Sheets

U.S. PATENT DOCUMENTS

| | | | |
|---|---|---|---|
| 2002/0065707 | A1 | 5/2002 | Lancaster et al. |
| 2002/0084891 | A1 | 7/2002 | Mankins et al. |
| 2002/0107873 | A1 | 8/2002 | Winkler et al. |
| 2002/0164962 | A1 | 11/2002 | Mankins et al. |
| 2003/0050843 | A1 | 3/2003 | Onoue |
| 2004/0073434 | A1 | 4/2004 | Volquardsen et al. |
| 2004/0153346 | A1 | 8/2004 | Grundel et al. |
| 2006/0064393 | A1 | 3/2006 | Orr |

OTHER PUBLICATIONS

PR Newswire Association, Inc., CCC's DriveLogic(TM) to Launch First End-to-End Internet Solution for Auto Collision Supply Chain; Seeks to Enhance Supply Chain Efficiencies, Cut Average Claims Cycle Time in Half, Aug. 3, 2000.

Business Wire, Inc., CCC Introduces Internet-Based ClaimScope Navigator; CCC Launches Web-Based Insurance Information Solution, Jul. 24, 2000.

Business Wire, Inc., CCC Introduces Web-Enabled Total Loss Solution to Automotive Claims Industry; Solution to Help Streamline the Claims Settlement Process, Jul. 12, 2000.

Business Wire, Inc., Mitchell International Extends e-Business Offerings; Ensera Products Add New Services and Broaden Depth of Functionality, Nov. 30, 2001.

Business Wire, Inc., Mitchell International Signs Major Contract With Members of the Great American Insurance Group, Nov. 6, 2001.

Thomson Financial, Newsline Briefs Insurance Networking & Data Management, Nov. 2001, American Banker-Bond Buyer a division of Thomason Publishing Corporation.

Mitchell Program Values Automobile Settlements, The National Underwriter Company Claims Magazine, Oct. 2001.

Business Wire, Inc., Mitchell International Announces Nationwide Availability of iNTOTAL.COM Total Loss Settlement Solution, Jun. 25, 2001.

Business Wire, Inc., Mitchell Adds Commercial Release of AIM Online to Its Suite of Internet Products for the Collision Repair and Claims Industry, Apr. 2, 2001.

Business Wire, Inc., New Functionality At eMitchell.com Enables "End to End" On-line Collision Repair Claims Processing, Feb. 5, 2001.

Business Wire, Inc., Mitchell Announces Commercial Availability of FirstImages.com; Joins Growing ASP Content at eMitchell.com; Lowers DRP Start-Up and Maintenance Costs for Insurance Companies, Feb. 5, 2001.

Business Wire, Inc., Mitchell International to Wirelessly Enable Its Internet Hub; Continued Execution of its e-Business Strategy Will Result in Increased Productivity and Cost Savings to Hub Participants, Dec. 8, 2000.

Business Wire, Inc., Mitchell International Delivers New Applications on Internet Hub for the Automotive Collision Repair and Claims Industry, Dec. 8, 2000.

| ADP | Autosource Valuation |
|---|---|

| Administrative Data | | 1998 Honda Accord LX 4D Sedan |
|---|---|---|
| Claims Department<br>ADP/Autosource<br>Falcon Testing Branch<br>2010 Crow Canyon Place<br>San Ramon CA 94583 | Claimant 01-Qctest-Mark-Last, 01-<br>Insured 01-Qctest-Mark-Last, 01-Qcte<br>Claim 01-QCTEST-MARK<br>Loss Date 08/19/2003<br>Loss Type Collision<br>Policy 01-QCTEST-MARK<br>Other | -156- |

| VINSOURCE Analysis | 1998 Honda Accord LX 4D Sedan |
|---|---|

No VIN entered
-158-

| Reported Phone Number Analysis | 1998 Honda Accord LX 4D Sedan |
|---|---|

The following vehicles have been advertised recently at the insured phone number reported. Detailed information is shown for a vehicle of the same year, make and model as the loss vehicle.

(925) 866-1100

| Publication | Advertised Vehicle | Date Listed | Price |
|---|---|---|---|
| Cars.com | 89 Porsche 928S4 | First 03/02/03<br>Last 03/29/03 | $25,000<br>$25,000 |
| Cars.com -152- | 99 Ford Explorer | First 05/27/03 | $13,900 |

| Valuation Summary | | | 1998 Honda Accord LX 4D Sedan |
|---|---|---|---|
| | Typical Vehicle | Loss Vehicle | Adjustment |
| Price | $9,700 | | $9,700 |
| Engine | 4 Cylinder 2.3 VTEC | 4 Cylinder 2.3 VTEC | |
| Transmission | 4 Speed Automatic -154- | 4 Speed Automatic | |
| Odometer | 83,230 Mi (Typical) | 85,000 Mi (Actual) | -60 |
| | | Equipment/Package Adjustment (See Valuation Detail) | 0 |
| | | Autosource Value Before Condition Adjustments | 9,640 |
| | | Total Condition Adjustments (See Condition Adjustment Detail) | 0 |
| | | Total Condition Adjusted Market Value | $9,640 |
| | | Applicable Tax 8.25% | 795.30 |
| | | Title Fee | |
| | | Transfer Fee | |
| | | Deductible | -500.00 |
| | | Net Adjusted Value | |
| | | Salvage/Other | |

| Vehicle Valuation Detail | 1998 Honda Accord LX 4D Sedan |
|---|---|

The TYPICAL VEHICLE represents the average mileage, condition, equipment level and estimated selling price of a vehicle of the same year, make, model, doors, edition, body and fuel type as the LOSS VEHICLE and is representative of the market area.

*FIG. 12*

SYSTEM AND METHOD FOR PROCESSING WORK PRODUCTS FOR VEHICLES VIA THE WORLD WIDE WEB

CROSS REFERENCE TO RELATED APPLICATIONS

This application is a continuation application of U.S. application Ser. No. 13/026,842 filed Feb. 14, 2011 now U.S. Pat. No. 8,200,513, which is a continuation of U.S. application Ser. No. 10/979,926 filed Nov. 1, 2004, now U.S. Pat. No. 7,912,740 issued Mar. 22, 2011.

BACKGROUND OF THE INVENTION

1. Field of the Invention

The subject matter disclosed generally relates to a method and system for entering data relating to an insurance claim for a damaged vehicle. The data is processed into a valuation report that is transmitted through the world wide web.

2. Background Information

When a vehicle such as an automobile is damaged the owner may file a claim with an insurance carrier. A claims adjuster typically inspects the vehicle to determine the amount of damage and the costs required to repair the automobile. If the repair costs exceed the value of the automobile, or a percentage of the car value, the adjuster may "total" the vehicle. The owner may then receive a check equal to the value of the automobile.

The repair costs and other information may be entered by the adjuster into an estimate report. After inspection the adjuster sends the estimate report to a home office for approval. To improve the efficiency of the claims process there have been developed computer systems and accompanying software that automate the estimate process. By way of example, the assignee of the present invention, Automatic Data Processing, Inc, ("ADP") provides a software product under the trademark PenPro that allows a claims adjuster to enter estimate data through a personal or laptop computer. The PenPro product maintains a running total of the cost to repair a damaged vehicle. When the running repair total reaches a percentage of an estimated value of the vehicle, the software provides a visual warning that the cost is approaching the vehicle value. This provides the adjuster with feedback that the vehicle may have to be totaled.

The vehicle valuation numbers contained by PenPro do not account for specific variations in vehicles such as vehicle condition or aftermarket equipment added to the vehicle. To obtain a more accurate valuation of the vehicle the adjuster can dial-in to a more extensive database. By way of example, ADP provides such a database under the trademark Autosource. Autosource provides the claims adjuster with a valuation report that contains a more accurate valuation of the damaged vehicle. Access to Autosource requires that the computer be specifically configured to dial the appropriate phone number(s) of the Autosource server. The claims adjuster's computer may not have this information. It would be desirable to provide a method and system that would allow a claims adjuster to more readily access a valuation database for damaged vehicles.

BRIEF SUMMARY OF THE INVENTION

A method and system for entering data relating to an insurance claim for a damaged vehicle and transmitting a valuation report for the damaged vehicle through the world wide web.

BRIEF DESCRIPTION OF THE DRAWINGS

FIGS. 4-11 are illustrations of web pages provided by the system; and,

FIG. 12 is an illustration of a valuation report.

DETAILED DESCRIPTION

Disclosed is a method and system for receiving data relating to an insurance claim for a damaged vehicle and transmitting a valuation report for the damaged vehicle over the world wide web. The system includes a client computer and a web server that are coupled through an electronic communication network such as the internet. The web server contains a web site that can display a plurality of web pages. Each web page allows an operator to enter the insurance claim data. The data can be processed into a valuation report by a separate valuation server. The valuation report can be transmitted to the client computer through the web server. A claims adjuster can access the web server by merely entering a uniform resource locator ("URL") into a web browser. The adjuster does not have to dial directly into the valuation server.

Figure 1:
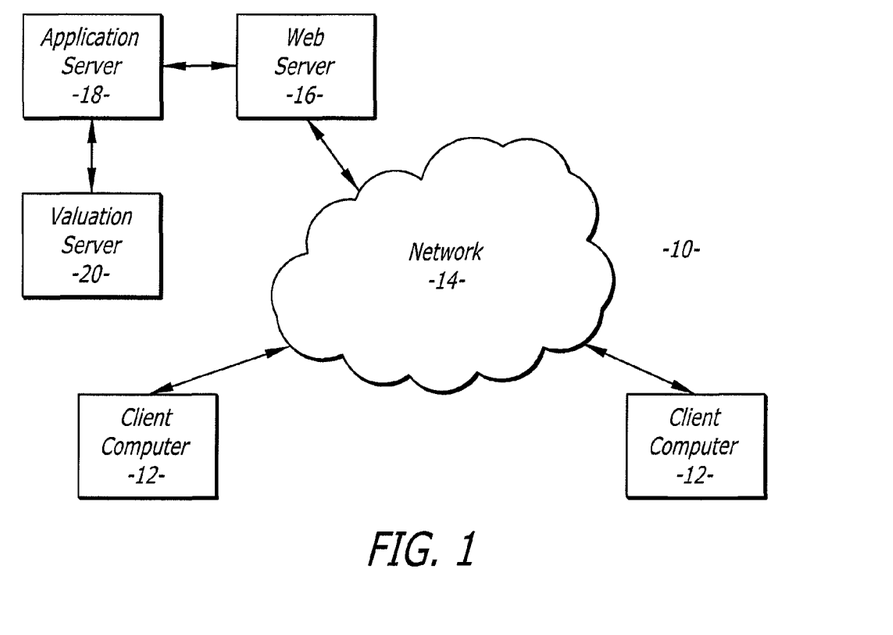
FIG. 1 is a schematic of a network system that can be used to receive data relating to an insurance claim for a damaged vehicle and transmit a valuation report for the damaged vehicle through the world wide web.

Referring to the drawings more particularly by reference numbers, FIG. 1 shows a system 10 that can be used to generate and transmit a valuation report that relates to an insurance claim of a damaged vehicle. The system 10 includes at least one client computer 12 that is connected to an electronic communication network 14. The electronic communication network 14 may be a wide area network (WAN) such as the internet. Accordingly, communication may be transmitted through the network 14 in TCP/IP format.

The system 10 may further include a web server 16 that is connected to the network 14 and an application server 18. The application server 18 may be coupled to a valuation server 20. The valuation server 20 may contain a database used to process and generate a valuation report. The web server 16 may provide a web based portal that interacts with the application server 18 to generate one or more insurance estimate web pages. By way of example, the web server 16 may contain active server page ("ASP") files that translate request from the client computer into calls to component object model ("COM") components resident in the application server 18. The COM components may include application programs that provide parts lists, calculate estimate data, etc. The ASP calls may also cause the generation of a valuation report in the valuation server. The valuation report can be transmitted to a client computer 12 through the web server 16.

Figure 2:
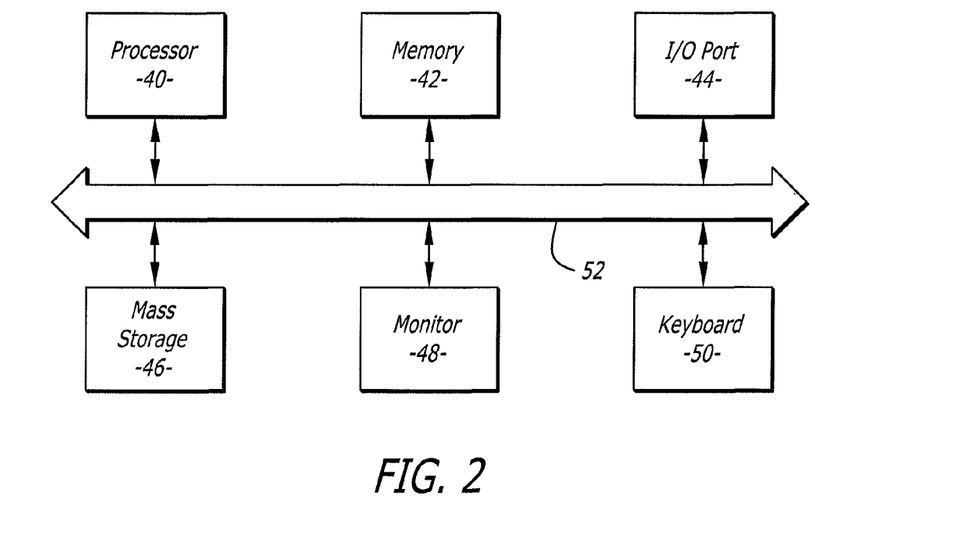
FIG. 2 is a schematic of a computer of the system.

FIG. 2 shows an embodiment of a computer 12 and the servers 16 and 18. The computer 12 includes a processor 40 connected to one or more memory devices 42. The memory device 42 may include both volatile and non-volatile memory such as read only memory (ROM) or random access memory (RAM). The processor 40 is capable of operating software programs in accordance with instructions and data stored within the memory device 42.

The processor 40 may be coupled to a communication port 44, a mass storage device 46, a monitor 48 and a keyboard 50 through a system bus 52. The communication port 44 may include an ETHERNET interface that allows data to be transmitted and received in TCP/IP format. The system bus 52 may be a PCI or other conventional computer bus. The mass storage device 46 may include one or more disk drives such as magnetic or optical drives. The mass storage device 46 may also contain software that is operated by the processor 40.

Without limiting the scope of the invention the term computer readable medium may include the memory device 42 and/or the mass storage device 46. The computer readable medium will contain software programs in binary form that can be read and interpreted by the computer. In addition to the memory device 42 and/or mass storage device 46, computer readable medium may also include a diskette, a compact disc, an integrated circuit, a cartridge, or even a remote communication of the software program. In general the servers 16 and 18 may contain more memory, additional communication ports and greater processing power than the computer 12.

The servers 18 and 20 may each contain a relational database(s) that correlates data with individual data fields and a relational database management system (RDBMS). The database(s) may include an original equipment guide database. By way of example, the database(s) of the processing server 20 may be the same or similar to Autosource provided by ADP of San Ramon, Calif.

Server 16 may include a website that can be accessed by the computers 12. The website has a specific uniform resource locator (URL) that can be used to access the site through the network 14. The URL can be entered through a web browser resident in the client computer 12.

Figure 3:
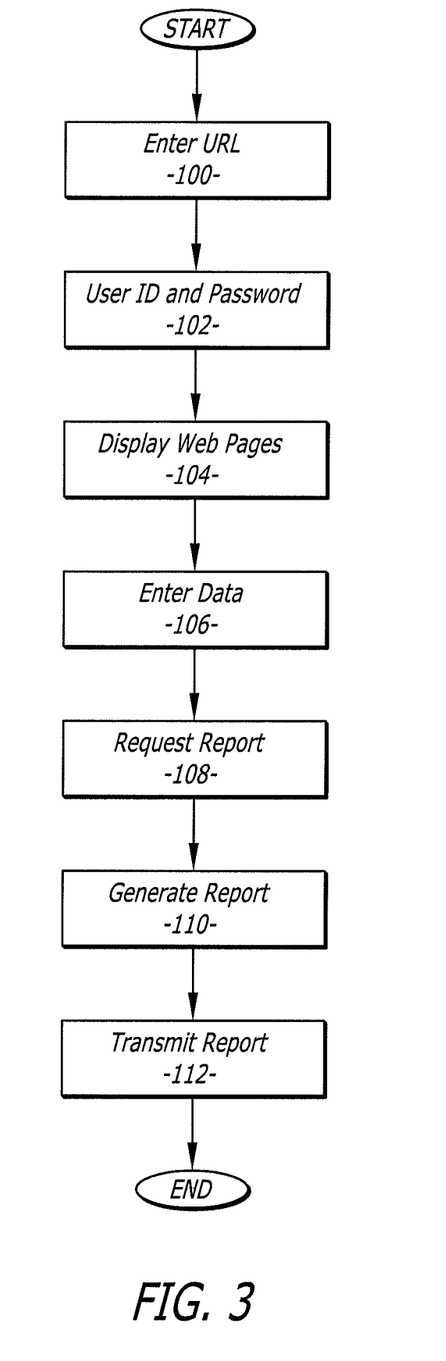
FIG. 3 is a flowchart showing a business transaction conducted through the system.

FIG. 3 shows a flowchart of a method for generating and transmitting a valuation report. In process block 100 an operator at the client computer may enter the URL into a network browser. The URL provides access to the web site at the web server. The web site may initially request a user ID and a password that are entered in block 102. The web site then displays a web page that contains various fields for inputting data relating to an insurance claim and links to other pages in block 104. The operator inputs the data in block 106.

The web pages are displayed and the operator enters data until the process detects a request for a report in decision block 108. The data is processed into a valuation report in block 110. By way of example, the data can be processed into a valuation report by a product provided by ADP under the trademark Autosource. Autosource contains a large number of original equipment guides (OEGs). The OEGs provide vehicle values based on the vehicle year, model, make, engine size, geographic location, etc. The valuation report is transmitted to the client computer in block 112.

Figure 4:
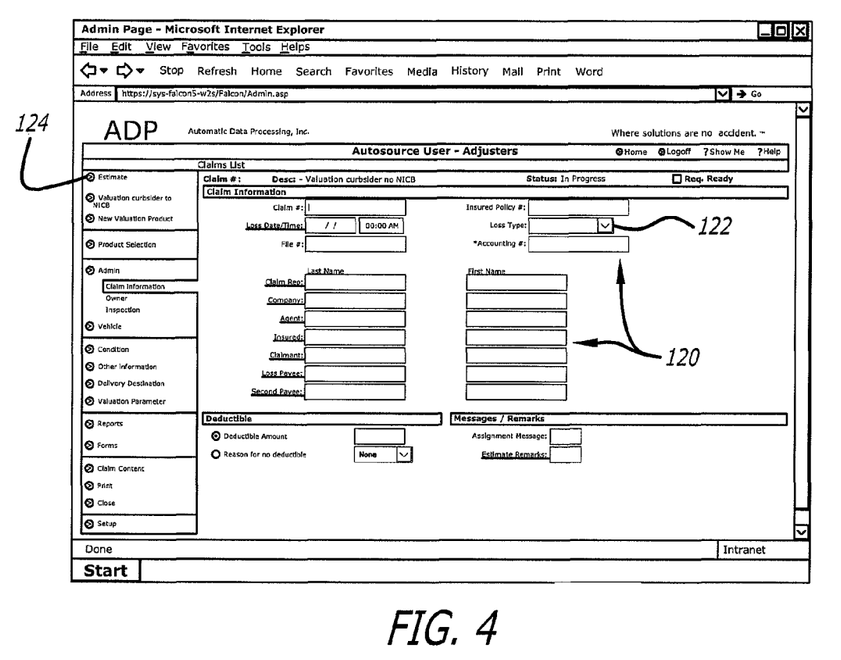
Figure 5:
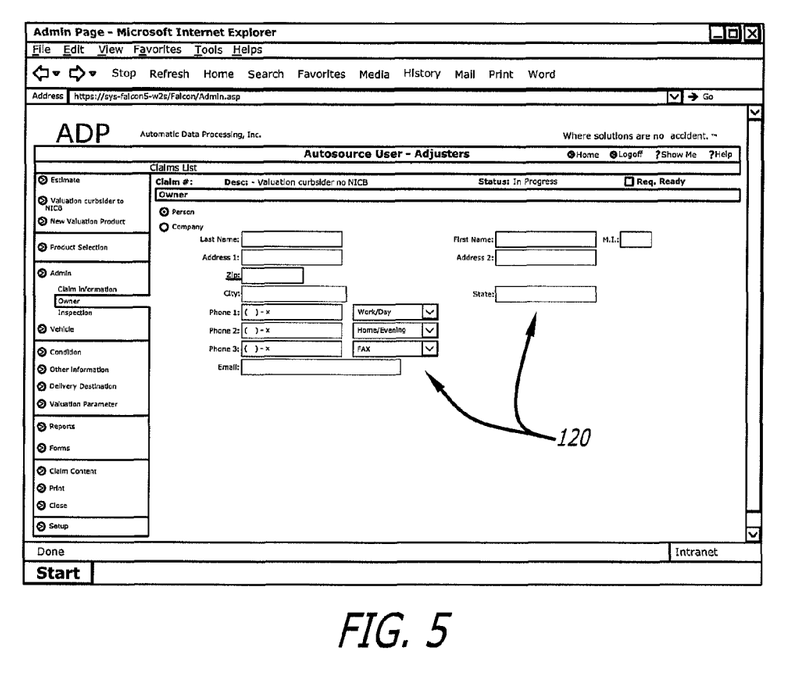
Figure 6:
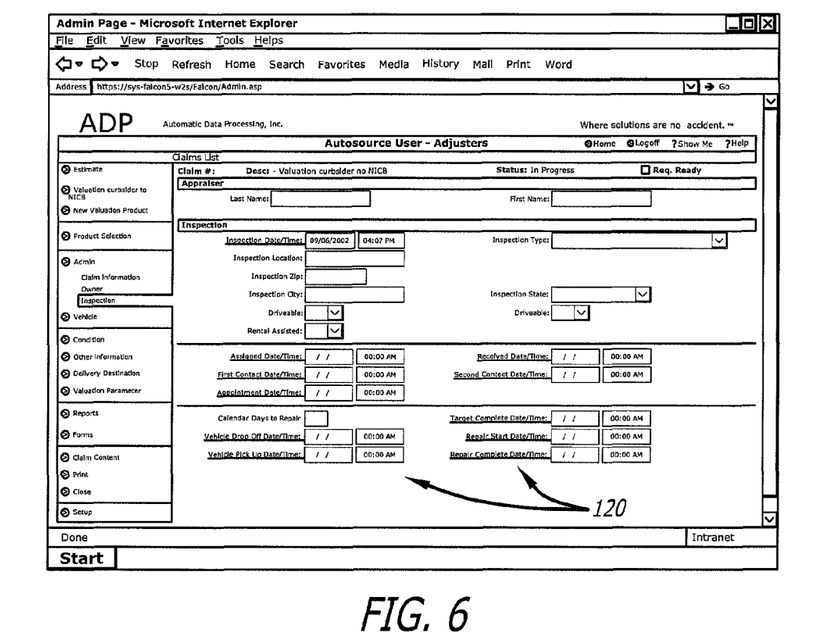

FIGS. 4, 5 and 6 show an embodiment of a number of web pages provided by the server 16. The web pages may each contain data fields 120 that allow an operator to enter data. The data fields 120 may have adjacent pull down boxes 122 that allow the operator to select a predetermined data entry. By way of example, the data fields may request claim numbers, insurance policy numbers, information regarding the agent, the owner, etc. Each web page may also contain links 124 to other web pages.

Figure 7:
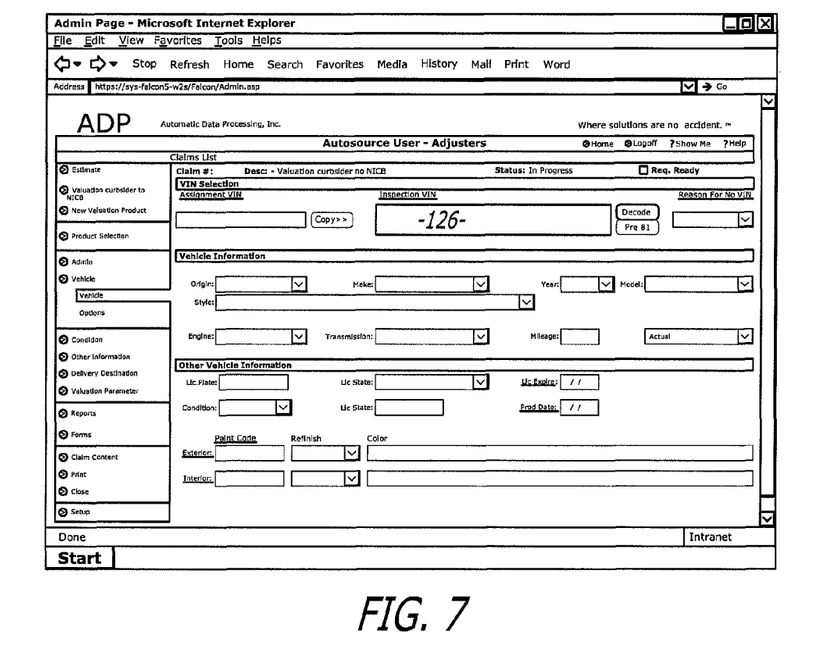

FIG. 7 shows a web page that provides a VIN (vehicle identification code) field 126. Upon entry of the VIN the process determines whether the same VIN has received a previous claim. If so, the valuation report may provide an indication that this vehicle has had a previous claim. This can be used by the operator to detect insurance fraud.

FIG. 8 shows a web page that provides an available packages field 128, an available options field 130 and an available aftermarket options field 132. Each field has a scroll down/up bar 134 that allows the operator to view packages, options and aftermarket options that are available for the specific vehicle in the claim. The operator can add or remove the packages and options present in the vehicle through the add 136 and remove 138 buttons. The process may utilize this data to generate the vehicle valuation.

FIGS. 9 and 10 show a web page that contains condition fields 140 that allow the operator to indicate the condition of the vehicle. Description fields 142 may be added to allow the operator to embellish the vehicle condition. The process may use the condition data to generate the vehicle valuation. For example, the operator at a client computer can enter their e-mail address in this field 144. The valuation report is then sent to the entered e-mail address.

FIG. 11 shows a web page that contains destination fields 144. The destination fields can be filled with information on the recipients of the valuation report. The report can be sent to more than one recipient through this page.

FIG. 12 shows a valuation report. The valuation report provides an adjusted market value for the vehicle in a value field 150. The report may have a field for the source of the data 152 and a field 154 that provides a general description of the vehicle. Administrative data such as the claim number may be presented in field 156. The report may also have a VIN field 158. The VIN field 158 contains the VIN entered into the VIN field 126 shown in FIG. 7. The report may also provide sample data and specific examples of similar vehicles and prices (not shown) that provides support for the market value. The market value may be adjusted based on mileage, condition of vehicle and other factors. The report is transmitted to the e-mail address(es) listed in the destination field 144 (see FIG. 11).

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A method for obtaining an automobile insurance claim valuation report of a damaged vehicle, comprising:
   receiving a uniform resource locator over an electronic communication network from a client computer;
   providing a web site that corresponds to the uniform resource locator, the web site provides at least one web page that relates to an insurance claim for the damaged vehicle;
   receiving data relating to the insurance claim, said data includes a vehicle year, a model and a geographical location;
   processing the entered data to automatically generate a valuation report for the damaged vehicle; and,
   transmitting the valuation report to the client computer over the electronic communication network through the web site.

2. The method of claim 1, wherein the data includes a vehicle engine size.

3. The method of claim 1, wherein the data includes aftermarket equipment that is used to generate the valuation report.

4. The method of claim 1, wherein the data includes a vehicle option that is used to generate the valuation report.

5. The method of claim 1, wherein the data includes a vehicle condition that is used to generate the valuation report.

6. The method of claim 1, wherein the data includes a vehicle identification number that is included in the valuation report.

7. The method of claim 1, wherein the valuation report is transmitted to a plurality of client computers.

8. The method of claim 1, further comprising transmitting the valuation report from a valuation server to a web server before transmitting the valuation report to the client computer.

9. The method of claim 1, wherein the data includes a vehicle make.

10. A system for obtaining an automobile insurance claim valuation report for a damaged vehicle, comprising:
- a web server that provides access to a web site that has at least one web page which allows for receipt of data relating to an insurance claim for the damaged vehicle and transmission of a valuation report for the damaged vehicle that is automatically generated with said data, said data includes a vehicle year, a model and a geographic location; and,
- a client computer coupled to said electronic communication network, said client computer can allow for the input of data into said web pages, and receive the valuation report.

11. The system of claim 10, further comprising a valuation server coupled to said web server, said valuation server processes the data and generates the valuation report.

12. The system of claim 11, wherein said data includes a vehicle engine size.

13. The system of claim 10, wherein said valuation server allows for input of aftermarket equipment.

14. The system of claim 10, wherein said valuation server allows for input of a vehicle option.

15. The system of claim 10, wherein said valuation server allows for input of a vehicle condition.

16. The system of claim 10, wherein said valuation server allows for input of a vehicle identification number that is included with the valuation report.

17. The system of claim 10, wherein the data includes a vehicle make.

18. A server for receiving data relating to insurance claims for a damaged vehicle and for causing transmission of a valuation report for the damaged vehicle, comprising:
- a memory device;
- a communication port; and,
- a processor that is coupled to said memory device, and said communication port, said processor operates in accordance with instructions to provide access to a web site that has at least one web page, the web page allows for receipt of data relating to an insurance claim for the damaged vehicle and transmission of a valuation report for the damaged vehicle that is automatically generated with said data, said data includes a vehicle year, a model and a geographic location.

19. The server of claim 18, wherein said web site allows for input of aftermarket equipment that is used to generate said valuation report.

20. The server of claim 18, wherein said web site allows for input of a vehicle option that is used to generate said valuation report.

21. The server of claim 18, wherein said web site allows for input of a vehicle condition that is used to generate said valuation report.

22. The server of claim 18, wherein said web site allows for input of a vehicle identification number that is included in the valuation report.

23. The server of claim 18, wherein the data includes a vehicle engine size.

24. The server of claim 18, wherein said data includes a vehicle make.

25. A computer program storage medium that can cause a computer to receive data relating to an insurance claim for a damaged vehicle and transmission of a valuation report for the damaged vehicle, comprising:
- a computer readable storage medium that contains a computer program which causes a server to provide access to a web site that has at least one web page, the web pages allows for receipt of data relating to an insurance claim for a damaged vehicle and transmission of a valuation report for the damaged vehicle that is automatically generated with said data by said computer program, said data includes a vehicle year, a model and a geographic location.

26. The storage medium of claim 25, wherein said web site allows for input of aftermarket equipment that is used to generate said valuation request.

27. The storage medium of claim 25, wherein said web site allows for input of a vehicle option that is used to generate said valuation report.

28. The storage medium of claim 25, wherein said web site allows for input of a vehicle condition that is used to generate said valuation report.

29. The storage medium of claim 25, wherein said web site allows for input of a vehicle identification number that is included in the valuation report.

30. The storage medium of claim 25, wherein the data includes a vehicle engine size.

31. The server of claim 25, wherein said data includes a vehicle make.

* * * * *

UNITED STATES PATENT AND TRADEMARK OFFICE
CERTIFICATE OF CORRECTION

Page 1 of 1

PATENT NO. : 8,468,038 B2
APPLICATION NO. : 13/463628
DATED : June 18, 2013
INVENTOR(S) : Vahidi et al.

It is certified that error appears in the above-identified patent and that said Letters Patent is hereby corrected as shown below:

Title Page, Item (75)

First Inventor's Name, replace "Reza-Sayed Vahidi" with "Seyed-Reza Vahidi"
First Inventor's Residence, replace "Pleaseanton" with "Pleasanton"

In the Claims

In Claim 10,
At Col. 5, lines 16 and 17, replace "electronic communication network" with "web server"
At Col. 5, line 18, replace "pages" with "page"

In Claim 13,
At Col. 5, line 25, replace "valuation" with "web"

In Claim 14,
At Col. 5, line 27, replace "valuation" with "web"

In Claim 15,
At Col. 5, line 29, replace "valuation" with "web"

In Claim 16,
At Col. 5, line 30, replace "valuation" with "web"

Signed and Sealed this
Third Day of December, 2013

Margaret A. Focarino
*Commissioner for Patents of the United States Patent and Trademark Office*